United States Patent
Veron et al.

(10) Patent No.: US 12,311,441 B2
(45) Date of Patent: May 27, 2025

(54) METHOD FOR MANUFACTURING A MULTI-MATERIAL PART BY ADDITIVE MANUFACTURING, USING THE TECHNIQUE OF POWDER BED SELECTIVE LASER MELTING OR SELECTIVE LASER SINTERING

(71) Applicants: THALES, Courbevoie (FR); CENTRE NATIONAL D'ETUDES SPATIALES, Paris (FR); UNIVERSITE PAUL SABATIER TOULOUSE III, Toulouse (FR); CENTRE NATIONAL DE LA RECHERCHE SCIENTIFIQUE, Paris (FR)

(72) Inventors: Frédéric Veron, Toulouse (FR); Olivier Vendier, Toulouse (FR); Philippe Tailhades, Saint-Orens (FR); Valérie Baco-Carles, Labarthe sur Leze (FR); Kateryna Kiryukhina, Toulouse (FR)

(73) Assignees: THALES, Courbevoie (FR); CENTRE NATIONAL D'ETUDES SPATIALES, Paris (FR); UNIVERSITE PAUL SABATIER TOULUSE III, Toulouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 499 days.

(21) Appl. No.: 17/793,199

(22) PCT Filed: Jan. 22, 2021

(86) PCT No.: PCT/EP2021/051485
§ 371 (c)(1),
(2) Date: Jul. 15, 2022

(87) PCT Pub. No.: WO2021/148624
PCT Pub. Date: Jul. 29, 2021

(65) Prior Publication Data
US 2023/0058595 A1    Feb. 23, 2023

(30) Foreign Application Priority Data

Jan. 23, 2020 (FR) .................................. 2000641

(51) Int. Cl.
*B22F 10/32* (2021.01)
*B22F 1/145* (2022.01)
(Continued)

(52) U.S. Cl.
CPC .............. *B22F 10/32* (2021.01); *B22F 1/145* (2022.01); *B22F 1/16* (2022.01); *B22F 10/28* (2021.01);
(Continued)

(58) Field of Classification Search
CPC .. B22F 10/32; B22F 1/145; B22F 1/16; B22F 10/28; B22F 10/34; B22F 10/36;
(Continued)

(56) References Cited

U.S. PATENT DOCUMENTS

2012/0251777 A1    10/2012   Duval et al.
2016/0090848 A1    3/2016    Engeli et al.
(Continued)

FOREIGN PATENT DOCUMENTS

CN    107 737 932 A    2/2018
CN    108 687 339 A    10/2018
(Continued)

OTHER PUBLICATIONS

Hasegawa, "Chapter 3.3—Ellingham Diagram", Treatise on Process Metallurgy, vol. 1:Process Fundamentals pp. 507-516, 2014.

*Primary Examiner* — Adil A. Siddiqui
(74) *Attorney, Agent, or Firm* — BakerHostetler

(57) ABSTRACT

A process for manufacturing a multi-material part by additive manufacturing, includes the following steps: a) a step of providing a pre-treated metal powder comprising grains and an oxidized and porous layer on a surface of the grains; b) a selective laser powder-bed fusion step comprising imple-
(Continued)

mentation of steps i) and ii) as follows: i) a step of forming a layer from the pre-treated metal powder; ii) a step of melting by laser the layer, the melting step being carried out under a reactive atmosphere and comprising changing parameters of application of the laser so that at least a first region of the layer is converted so as to lower the electrical conductivity thereof, thus forming a dielectric, and so that at least a second region of the layer is densified without converting it, the at least a first region being formed when the parameters of application of the laser allow a first energy density to be applied to the first region and/or the laser beam to be kept for a first dwell time on the first region, the at least a second region being formed when the parameters of application of the laser allow a second energy density to be applied to the second region and/or the laser beam to be kept for a second dwell time on the second region, and the first energy density being higher than the second energy density and/or the first dwell time being longer than the second dwell time. A part obtained using the process is also provided.

16 Claims, 9 Drawing Sheets

(51) Int. Cl.
| | | |
|---|---|---|
| *B22F 1/16* | (2022.01) | |
| *B22F 10/28* | (2021.01) | |
| *B22F 10/34* | (2021.01) | |
| *B22F 10/36* | (2021.01) | |
| *B22F 10/38* | (2021.01) | |
| *B22F 12/40* | (2021.01) | |
| *B33Y 10/00* | (2015.01) | |
| *B33Y 40/10* | (2020.01) | |
| *B33Y 70/10* | (2020.01) | |
| *C22C 1/10* | (2023.01) | |

(52) U.S. Cl.
CPC .............. *B22F 10/34* (2021.01); *B22F 10/36* (2021.01); *B22F 10/38* (2021.01); *B22F 12/40* (2021.01); *B33Y 10/00* (2014.12); *B33Y 40/10* (2020.01); *B33Y 70/10* (2020.01); *C22C 1/1078* (2013.01); *B22F 2999/00* (2013.01); *C22C 2204/00* (2013.01)

(58) Field of Classification Search
CPC ...... B22F 10/38; B22F 12/40; B22F 2999/00; B22F 3/1143; B33Y 10/00; B33Y 40/10; B33Y 70/10; B33Y 80/00; C22C 1/1078; C22C 2204/00; C22C 1/0416; C22C 29/12; C22C 29/16; Y02P 10/25
See application file for complete search history.

(56) References Cited

U.S. PATENT DOCUMENTS

2018/0126457 A1   5/2018  Hou et al.
2018/0193916 A1   7/2018  Lou et al.

FOREIGN PATENT DOCUMENTS

CN       110 331 324 A     10/2019
WO       2018/084056 A1     5/2018

METHOD FOR MANUFACTURING A MULTI-MATERIAL PART BY ADDITIVE MANUFACTURING, USING THE TECHNIQUE OF POWDER BED SELECTIVE LASER MELTING OR SELECTIVE LASER SINTERING

CROSS-REFERENCE TO RELATED APPLICATIONS

This application is a National Stage of International patent application PCT/EP2021/051485, filed on Jan. 22, 2021, which claims priority to foreign French patent application No. FR 2000641, filed on Jan. 23, 2020, the disclosures of which are incorporated by reference in their entirety.

FIELD OF THE INVENTION

The present invention pertains to the field of use of laser powder-bed fusion (LPBF), and more precisely of selective laser melting (SLM) or selective laser sintering (SLS) of a powder bed, to obtain multi-material parts by additive manufacturing. In the remainder of this description, the expression "selective fusion" is understood to mean selective fusion obtained either by melting or by sintering.

The invention relates to a process for manufacturing a multi-material part using the technique of selective laser powder-bed fusion, and to a multi-material part produced by this process.

BACKGROUND

The underlying general problem is manufacture of multi-material parts with complex shapes, comprising metal portions and dielectric portions in the build plane and in the build direction, such being referred to as "3D" multi-material parts.

The term "dielectric" is understood to mean a substance of low conductivity in which a strong electric polarization may appear in the presence of an electric field. One example of a dielectric according to the invention is an oxide ceramic (metal oxide) or a non-oxide ceramic such as a nitride ceramic (metal nitride) or a silicon oxide ($SiO_x$).

Certain sought-after 3D multi-material parts may be made up of periodic dielectric patterns embedded in a metal matrix or conversely of periodic metal patterns embedded in a dielectric matrix. Specifically, the periodic organization of the dielectric or metal may generate a metamaterial endowed with novel properties. The term "metamaterial" is understood to mean an artificial composite that has optical, magneto-optical, acoustic or electromagnetic properties that are not found in natural materials.

The invention may in particular be applied to production of multi-material parts for electronic devices, for example passive microwave devices such as dielectric resonator filters or 3D transitions for integrated microwave front-ends for active antennas, for metal devices comprising thermal or mechanical protection by a dielectric, metal devices the optical properties of which are modified by a dielectric, and/or metamaterials.

PRIOR ART

The sought-after 3D multi-material parts comprise metal portions and other portions made of dielectric (typically of a metal-oxide or metal-nitride ceramic) in the build plane (XY) and in the build direction (ZX or ZY), such as illustrated in FIGS. 1A and 1B in which have been shown dielectric portions D in a metal matrix M (FIG. 1A) or metal portions M in a dielectric matrix D (FIG. 1B).

Multi-material additive-manufacturing solutions are known.

The expression "additive manufacturing" is understood to mean, according to standard ISO/ASTM 52900, "process of joining materials to make parts from 3D model data, usually layer upon layer". This term applies to dozens of manufacturing technologies, these being classified into seven process categories according to the above standard.

Additive manufacturing by binder jetting is a process in which a powder bed is spread and then a nozzle projects a liquid binder to solidify a section of the part in the build plane (XY). It is necessary to remove the binder and to densify the part using a conventional heat treatment. It is possible to use any type of powder (polymer powder, metal powder, ceramic powder) or a mixture of powders to manufacture multi-material parts in composite form. However, this technique requires an additional step to inspect for binder shrinkage, which may prove critical when it is important for parts to meet dimensional tolerances, as in the case of passive microwave functions. In addition, this technique does not allow, or makes it very difficult, to form different materials in the same plane (build plane XY).

Additive manufacturing by material/ink jetting is a process in which a printhead that is movable along three axes projects a photosensitive polymer, which plays the role of an ink, and which is then polymerized by UV radiation. The polymers may be filled with (ceramic, metal) particles of interest. Certain systems comprise multi-channel printheads allowing various polymers (which may be filled with different particles) to be projected selectively. The photopolymerization produced by the UV radiation makes it possible to obtain a multi-material part a polymer matrix of which contains portions filled with ceramic or metal fillers in all three dimensions.

Additive manufacturing by vat photopolymerization is a process in which a liquid photosensitive polymer is contained in a vat possessing at its bottom a window that is transparent to UV radiation: an energy source (a laser for example) selectively polymerizes the liquid resin in the build plane through this window. A platform (or build plate) that is movable in the build direction is made to rise by a controlled amount, allowing liquid resin to fill the gap between the previous polymerized layer and the transparent window. A new iteration is carried out, and so on until the sought-after part is obtained. The resins may be filled with (metal or ceramic) particles of interest, so as to form a single-material or composite part. This technique requires suitable devices to be provided, allowing the resin bath to be changed during manufacture, so as to obtain a part that is truly "multi-material" in three dimensions and not merely a composite part.

Additive manufacturing by material extrusion is a process in which, to manufacture a part, a printhead that is movable along three axes continuously extrudes a polymer matrix filament. Multi-filament printheads the polymer matrix filaments of which may be filled with (metal or ceramic) particles of interest allow multi-material parts to be manufactured.

The latter three additive-manufacturing techniques use polymers filled with particles, this having the following drawbacks:
 temperature resistance is limited depending on the type of polymer, this causing problems with parts and/or portions of parts not meeting dimensional tolerances, in particular if the polymer is removed, or with unsatisfactory microwave characteristics;

microwave dielectric losses are in particular higher in polymers than in ceramics, especially if the polymer is not removed;

the presence of polymer may also cause contamination, polymers having a tendency to capture particles and then to release them.

Additive manufacturing by directed energy deposition is a process in which a head that is movable in three directions projects metal powder that is simultaneously melted under a laser beam (LENS for laser engineered net shaping) or an electron beam (EBAM for electron beam additive manufacturing), allowing a part to be obtained. However, although it seems possible to stack layers of various materials (metal-metal and metal-ceramic stacks) using LENS technology, on the one hand the resolution of the parts is not good enough for microwave applications, and on the other hand it is only possible to obtain stacks of different materials (i.e. stacks in the build direction): this technique does not allow both different materials to be simply formed in the same plane (build plane) and precise dimensional constraints to be met.

Additive manufacturing by powder-bed fusion is a process in which a layer of powder of controlled thickness is spread on a build plate. This powder may be a polymer, a metal, a ceramic or even a composite mixture. A source of energy (laser or electron beam) allows the powder to be selectively melted or selectively sintered in the build plane. Another layer of powder is spread over the previous layer and the manufacturing process is iterated until a part is formed. Among this family of techniques, mention may be made of the techniques described below.

It will be noted that the term "selective" means in defined regions. In other words, techniques for selectively melting or selectively sintering a powder bed allow the powder to be melted or sintered in particular regions.

In the so-called MJF process (MJF standing for multi jet fusion) the material of interest is mixed with a polymer, and it therefore has the aforementioned drawbacks of additive manufacturing techniques that use polymers filled with particles of interest.

In the so-called SLS process (SLS standing for selective laser sintering), which is a so-called "indirect" process, or in the so-called SLM process (SLM standing for selective laser melting), which is also a so-called "indirect" process, materials of interest such as high-melting-point ceramics and metals are coated or mixed with polymers and then processed in the SLS or SLM machine. Under the effect of the laser, these polymers melt and bind the metal or ceramic materials together, and the materials are sintered at high temperature after evaporation of the polymer. Thus, the aforementioned drawbacks of additive manufacturing techniques that use polymers filled with particles of interest are also issues here. Furthermore, although SLS and SLM allow composite multi-material parts to be produced, they do not allow parts with metal portions and ceramic portions or, more broadly, dielectric portions to be produced in 3D, as sought in the present invention.

In the EBM process (EBM standing for electron beam melting) only a conductor (metal) may be used, this preventing parts comprising metal portions and ceramic portions (typically of the associated metal oxide or nitride) from being produced.

In the SLM process, metal, ceramic or cermet powders (cermet=ceramic-metal mixture) may be used to manufacture 3D multi-material parts, i.e. parts comprising metal portions and other portions made of ceramic in the build plane and in the build direction. However, this generally requires a suitable experimental device to be used or the powder to be changed during manufacture, this in both cases complicating the process. Furthermore, although it seems possible, under these conditions, to stack layers of different materials in the build direction (change of powders during manufacture: for example a ceramic powder replaces the metal powder or vice versa), this runs the risk of contamination of one powder by another. Lastly, known SLM techniques do not allow two different materials to be formed in the build plan.

Thus, either the aforementioned known techniques do not allow multi-material parts to be manufactured with different materials in the build plane, or they cause other difficulties that make it complicated or even impossible to produce parts for the microwave applications that are in particular targeted by the invention.

SUMMARY OF THE INVENTION

The invention aims to overcome the aforementioned drawbacks of the prior art.

More precisely, the invention aims to provide a process for manufacturing multi-material parts and in particular multi-material parts with complex shapes, comprising metal portions and dielectric portions (typically metal-oxide ceramic portions or metal-nitride ceramic portions) in the build plane and in the build direction.

In particular, the invention aims to manufacture multi-material parts with, in the three directions of space, distinct metal and dielectric portions that may be arranged periodically and have any aspect ratio, with a precision commensurate with the targeted fields, and for example with the needs of microwave engineering (precision of typically 100 μm or less, depending on the size of the laser beam, on the diffusion of heat around the laser beam, the required precision depending on the targeted frequency band).

Advantageously, the invention aims to provide a manufacturing process in which it is not necessary to change powder during manufacture.

Advantageously, the invention aims to provide a manufacturing process that allows a conventional SLM device to be used, i.e. one that does not require the latter to undergo significant modifications.

One subject of the invention allowing these drawbacks to be tackled is a process for manufacturing a multi-material part by additive manufacturing, said process comprising the following steps:

a) a step of providing a pre-treated metal powder comprising grains and an oxidized and porous layer on a surface of said grains;

b) a selective laser powder-bed fusion step comprising implementation of steps i) and ii) as follows:

i) a step of forming a layer from the pre-treated metal powder;

ii) a step of melting by laser all or some of said layer of pre-treated metal powder, said melting step being carried out under a reactive atmosphere and said melting step comprising changing parameters of application of the laser so that at least a first region of said layer of pre-treated metal powder is converted so as to lower the electrical conductivity thereof, thus forming a dielectric, and so that at least a second region of said layer of pre-treated metal powder is densified without converting it, the at least a first region being formed when the parameters of application of the laser allow a first energy density to be applied to said first region and/or the laser beam to be kept for a first dwell time on said first region, the at least a second region being formed when the parameters of application of the laser allow a second energy density to be applied to said second region and/or the laser beam to be kept for a second dwell time on said second region, and the first energy density being higher than the second energy density and/or the first dwell time being longer than the second dwell time.

The process thus applies an SLM or SLS technique to a powder bed.

The layer of pre-treated metal powder may comprise one or more regions not subjected to the laser, as is generally the case when producing parts by additive manufacturing using a powder-bed fusion technique.

A layer of pre-treated metal powder is formed by depositing pre-treated metal powder, typically on a platform or on a previously formed layer. The thickness of the layer formed may vary from one layer to the next.

In at least one layer, a material containing a predominantly dielectric first region and a predominantly metal second region is obtained.

The process may comprise a plurality of successions of steps i) and ii).

The process may also comprise, for at least one layer of powder, instead of carrying out step ii), carrying out an alternative step in which only at least a mainly dielectric first region is formed.

The process may also comprise, for at least one layer of powder, instead of carrying out step ii), carrying out an alternative step in which only at least a mainly metal second region is formed.

The solution is to use a metal powder that is pre-treated, the pre-treatment generally being a chemical pre-treatment with an oxidizing reagent (redox reaction). The powder may be provided already pre-treated, or be pre-treated during the process.

The pre-treatment of the powder must be such as to replace any compact passivation layer of the metal with an oxidized (valence state of the metal higher than zero) and porous layer. This oxidized and porous layer facilitates the subsequent conversion of metal into dielectric at the core of the grains of the powder during additive manufacturing, depending on the desired features. The modification of the surface of the grains allows optical absorbance to be increased and thus the conversion into dielectric to be facilitated.

One example of a dielectric according to the invention is an oxide ceramic (metal oxide) or a non-oxide ceramic such as a nitride ceramic (metal nitride) that is associated with the metal or with a metal of the alloy of the metal powder. Another example is silicon oxide ($SiO_x$).

Like any additive-manufacturing powder, this pre-treated powder may subsequently be placed in a powder supply tank of an additive-manufacturing laser powder-bed fusion machine.

This pre-treatment, combined with suitable parameters of laser application, allows the pre-treated metal powder to be melted and converted into dielectric or, alternatively, the metal powder to be melted in order to densify it without converting it, in the build plane (in one powder layer) and in the build direction (in various layers). Specifically, the parameters of laser application are chosen either to raise the powder to a temperature and then keep it there for a sufficient length of time in order to form a dielectric, or to raise the powder to a more suitable temperature, above all for a shorter length of time, in order to keep the majority thereof metal, and to densify it without converting it. The parameters are therefore chosen to reflect the regions that it is desired to mainly convert into dielectric, and the regions that it is desired to mainly densify in metal form.

The terms "densification" and "densify" are known to those skilled in the art in the field of powder metallurgy. They are respectively understood to mean an operation and act whereby the density of a material is increased, generally by sintering or melting. Densification of a powder amounts to agglomerating grains together so as to form a material the porosity of which is lower or even zero. The term "dense" describes a material of low or even zero porosity.

The invention therefore consists in adjusting the reactivity of a metal powder by means of a prior pre-treatment aimed at creating a porous oxidized layer on its surface, so that it may then, in the step of selective fusion of the powder, in predetermined regions, be converted into dielectric or merely densified in the metal state. The geometry and relative positioning of the predominantly dielectric and predominantly metal regions may be set by programming a conventional additive-manufacturing device. The invention therefore allows the selectivity of the metal powder to be adjusted both in the build plane and in the build direction, aspect ratios being in keeping with the LPBF technique.

This is one important advantage of the invention with respect to prior-art solutions, because it allows the metal or dielectric portions of multi-material parts to be produced with any aspect ratio, while limiting the risk of dimensional errors.

Another advantage of the process is its simplicity.

In particular, the process of the invention makes it possible to use only a single powder, namely a metal powder, contrary to prior-art processes which require a plurality of powders to be provided to produce multi-material parts. It therefore makes it possible to dispense with successive implementation of two powders (a metal powder and a dielectric and in particular ceramic powder), which has the drawback of complicating the process and device, and furthermore of running the risk of causing contamination of one material by another.

Therefore, the invention does not require the additive-manufacturing device to be modified (for example by adding a system of nozzles or a system for sucking up/depositing powder to decrease contamination of one powder by another, which systems are generally difficult to adapt for a laser powder-bed fusion device). It is thus possible to use a conventional additive-manufacturing powder-bed fusion device.

By definition, a metal powder is a metal or an alloy in a finely divided state, comprising a plurality of grains. The standard powders used in additive manufacturing by powder-bed fusion have grains the particle size of which typically varies from a few microns to a few tens of microns.

According to the invention, the metal powder used is a metal powder or a metal-alloy powder, and is suitable for additive manufacturing by powder-bed fusion.

According to the invention, the expression "surface-oxidized metal powder" is understood to mean that the surface of the grains of the powder is oxidized, or at least that the surface of most of the grains of the powder is oxidized. The grains are thus not oxidized in their entirety, and on the whole a volume of metal must remain at the core thereof. Furthermore, the oxidized layer is porous and replaces the passivation layer of the grains.

Typically, this is the result for example of formation of a porous oxidized layer, and for example of a metal-oxide layer, a metal-hydroxide or metal-oxyhydroxide layer (if the chemical treatment is with a base) or even of a layer of metal salt (if the chemical treatment is with an acid), on the surface of the grains of the metal powder. For the sake of simplicity, in the remainder of the description, the term "oxidized layer" may be used to designate such an oxidized and porous surface layer.

When an oxidizing reagent is used, an oxidation-reduction reaction takes place with the metal: the reagent oxidizes the metal and the metal reduces the reagent. The metal therefore loses electrons and forms a new oxidized compound on the surface of the grains (a metal salt if the reagent is an acid or a metal oxide if the reagent is basic). This chemical attack modifies the surface state of the metal grains by generating a porous layer.

Preferably, the thickness of the oxidized and porous layer formed on the surface of the grains is larger than or equal to 0.02 µm. Preferably, the thickness of the oxidized and porous layer formed on the surface of the grains is smaller than or equal to 5 µm.

According to one embodiment, the process comprises, prior to the providing step, a step of pre-treating a metal powder so as to form an oxidized and porous layer on the surface of the grains.

According to one embodiment, the pre-treating step comprises bringing the metal powder into contact with an oxidizing reagent to achieve an oxidation-reduction reaction of said metal powder, the oxidizing reagent preferably being a strong acid or a strong base, and for example a halogen acid or an alkali hydroxide.

Preferably, the reagent makes contact with the grains all the way therearound. The reagent generally takes the form of a solution of relatively high active-element concentration. The solution may impregnate the powder or be sprayed onto the grains.

According to one particular embodiment, the pre-treating step comprises bringing the metal powder into contact with a strong acid, preferably a halogen acid, hydrochloric acid or hydrofluoric acid for example.

According to another particular embodiment, the pre-treating step comprises bringing the metal powder into contact with a strong base, preferably an alkali hydroxide, a sodium hydroxide or a potassium hydroxide for example.

According to one alternative embodiment, the pre-treating step comprises bringing the metal powder into contact with water at a temperature higher than or equal to 80° C.

According to one embodiment, the pre-treating step comprises, subsequent to the oxidation-reduction reaction, at least one among the following steps: a drying step, a grinding step, a sieving step.

Other techniques may be employed to form an oxidized and porous layer on the surface of the grains. Among them, mention may be made of a plasma treatment in oxygen, a deposition by chemical vapor deposition (CVD), attack in acid vapor, or even a suitable heat treatment.

Next, i.e. after the step of providing the pre-treated powder, it is a question of converting at least a first region of the pre-treated metal powder into dielectric, and of densifying at least a second region of the pre-treated metal powder in metal form without converting it.

To convert the pre-treated metal powder into dielectric in the selective laser powder-bed fusion step, a chemical reaction must be produced between a gas and the metal powder, at high temperature for a certain length of time. For example, the dielectric may be a ceramic obtained via a chemical conversion of the pre-treated metal powder, typically an oxidation or a nitridation.

When a metal is oxidized in this way, Wagner's theory of oxidation rate teaches that the mass of oxide obtained from the metal and oxygen in the air depends on:
 the area of contact between the gas and the metal;
 temperature;
 the length of time spent at temperature;
 the partial pressure of oxygen in the chamber.

By high temperature, what is meant is a temperature higher than or equal to the melting point of the metal or of the metal alloy.

The rate obtained for oxidation may be generalized to nitridation.

The temperature of the metal powder and the time spent at temperature are related to the energy density transmitted to said metal powder.

Energy density, expressed per unit area (in $kJ/mm^2$), is defined to be the product of the energy transmitted by the power of the laser beam and of the time for which the laser beam dwells on said unit area. For a given region, the energy received is then the product of the energy density and of the area of the region on which the laser beam dwells.

For a given laser power, the energy density is directly related to the dwell time of the laser on a unit area (which is logically related to the time spent at temperature).

According to the invention, certain parameters of application of the laser to the layer of pre-treated metal powder are adjusted depending on whether it is sought to form a dielectric or to densify the metal in a given region of the layer. Other parameters of application of the laser may be kept constant, depending on whether it is sought to form a dielectric or to densify the metal.

Furthermore, other additive-manufacturing parameters—which are not parameters of application of the laser—are generally defined (layering thickness, atmosphere inside the chamber of the additive-manufacturing device, etc.), but these parameters generally remain constant irrespectively of whether it is sought to form a dielectric or to densify the metal.

Thus, parameters of application of the laser may be adjusted depending on the region so as to apply:
 a first energy density, i.e. a laser beam with a first power for a first dwell time, to at least a first region of the layer so as to convert said first region into dielectric; and/or
 a second energy density, i.e. a laser beam with a second power for a second dwell time, to at least a second region of the layer so as to densify said second region without converting it,
 the first dwell time being longer than the second dwell time and/or the first energy density being higher than the second energy density.

Typically, the first dwell time is at least five times longer than the second dwell time, and preferably at least ten times longer.

For example, the first dwell time is of the order of one second, i.e. a few seconds or even a little shorter than one second, and the second dwell time is of the order of one tenth of a second, i.e. a few tenths of a second, or even a little shorter than one tenth of a second, and shorter than one second.

According to a particular embodiment, the first energy density is comprised between 6 and 30 $kJ\ mm^{-2}$ and/or the second energy density is comprised between 0.2 and 5 $kJ\ mm^{-2}$.

Preferably, the parameters of application of the laser allowing the dwell time of the laser beam and therefore the energy density applied to a region of the powder layer to be varied are chosen from: the speed of movement of the laser, the spacing between two successive positions of the laser, the power of the laser and the distance traveled by the laser during a movement (and optionally the area scanned by the laser). These parameters may have an effect on the conversion rate of the pre-treated metal powder and are very easily programmable.

It will be noted that the distance traveled by the laser is not necessarily traveled in a straight line, as will be described below.

The first laser power may be comprised between 30 and 60 W, for example 50 W. The second laser power may be comprised between 30 and 60 W, for example 50 W.

According to one embodiment, the first laser power used when forming the at least a first region is equal to the second laser power used when forming the at least a second region.

According to one embodiment, the first speed of movement used when forming the at least a first region is comprised between 10 and 1000 mm·s$^{-1}$ and the first spacing used when forming the at least a first region is smaller than 10 μm.

According to a particular embodiment, the first speed of movement is comprised between 100 and 1000 mm·s$^{-1}$.

According to one embodiment, the second speed of movement used when forming the at least a second region is comprised between 30 and 5000 mm·s$^{-1}$ and the second spacing used when forming the at least a second region is comprised between 1 and 200 μm.

According to a particular embodiment, the second speed of movement is comprised between 100 and 1000 mm·s$^{-1}$.

According to one embodiment, the first distance traveled by the laser to form the at least a first region is smaller than or equal to 2 mm.

Secondarily, it is possible to vary other parameters of the laser, such as the diameter of the laser beam. The diameter of the laser beam is typically comprised between 40 and 100 μm, and is for example equal to 70 μm. However, it is possible to enlarge it by defocusing it. At equal laser power, this allows the energy density applied by the laser beam to be decreased.

According to one embodiment, the fusion step is carried out under an oxidizing atmosphere.

According to another embodiment, the fusion step is carried out under a nitriding atmosphere.

Another subject of the invention is a part obtained using the process and comprising at least a first portion mainly comprising dielectric first regions and at least a second portion mainly comprising metal second regions, in the build plane and in the build direction.

According to one embodiment, the first portion is periodically distributed in a metal matrix or the second portion is periodically distributed in a dielectric matrix.

According to one embodiment, the part comprises a metal core covered with a thermal barrier made of dielectric.

BRIEF DESCRIPTION OF THE DRAWINGS

Other features and advantages of the invention will become apparent through the following description given by way of non-limiting illustration, provided with reference to the appended figures, in which.

DETAILED DESCRIPTION

Figure 1A:
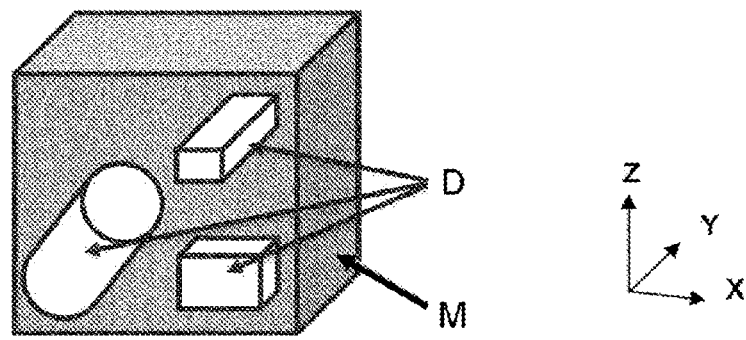
FIG. 1A illustrates a multi-material part comprising dielectric portions in a metal matrix.
Figure 1B:
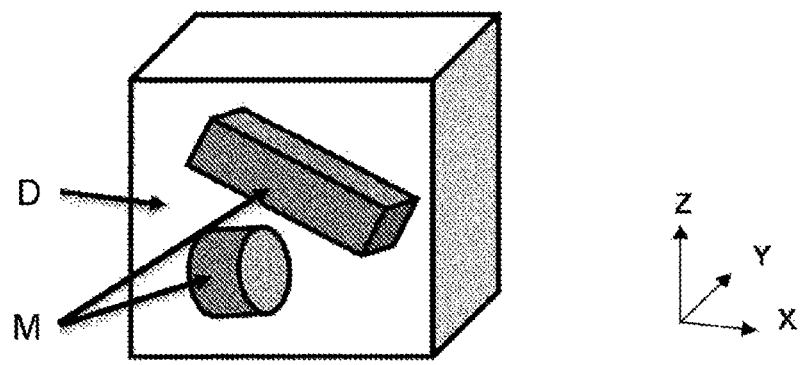
FIG. 1B illustrates a multi-material part comprising metal portions in a dielectric matrix.

FIGS. 1A and 1B have already been described and will not be described again here.

The invention relates to a process that combines use of a metal powder that is pre-treated, i.e. so that there is an oxidized and porous layer on the surface of the grains of said powder, and fusion of said pre-treated powder via the technique of laser powder-bed fusion, the parameters of which are chosen to melt and convert the bed of pre-treated metal powder into mainly dielectric (typically a metal-oxide ceramic or metal-nitride ceramic) and/or into mainly metal, selectively, under a reactive (typically oxidizing or nitriding) atmosphere.

The additive-manufacturing parameters of the laser powder-bed fusion technique comprise parameters of application of the laser, but also layering parameters of the powder, the choice of the atmosphere in the chamber of the additive-manufacturing device, etc.

According to one embodiment, the process comprises a step of pre-treating a metal powder so as to form an oxidized and porous layer on the surface of the grains.

Pre-Treating Step

The aim of the pre-treatment is to form an oxidized and porous layer on the surface of the grains of the metal powder. This allows the reactivity of the powder with the gas contained in the chamber in the additive-manufacturing step to be modified. The thickness of the oxidized layer must be sufficient to sufficiently modify the absorbance of the metal powder. However, it must not be too large in order for on the whole a volume of metal to remain at the core of each grain. In other words, the aim of the pre-treatment is to modify the surface of the grains sufficiently to make the powder more reactive with the gas contained in the additive-manufacturing chamber, by creating a porous oxidized layer around the grains. This has the consequence of increasing the absorbance of the powder at the wavelength of the laser, and therefore of facilitating the transfer of energy to the powder, while keeping the metal phase in the majority.

The inventors have determined that it is recommendable for the average thickness of the oxidized and porous surface to be comprised between 0.02 and 5 μm, although this range is non-limiting and depends in particular on the metal or alloy from which the powder is made, on the particle size of said powder, on the targeted reactivity in the additive-manufacturing step, etc.

According to one embodiment, the pre-treatment is a chemical pre-treatment, and preferably one that uses an oxidizing reagent to produce an oxidation-reduction reaction with the metal. The oxidation-reduction reaction modifies the surface state of the metal grains by generating a porous layer.

As those skilled in the art know, oxidation-reduction reactions depend on pH (which itself depends on reagent concentration and on the dissociation constant of the reagent) and on the potential of the solution containing the oxidant and the reducing agent with respect to the standard hydrogen electrode, according to the Pourbaix diagram. The oxidation-reduction reaction may therefore be parameterized depending on the type of metal powder (reducing agent) and on the chosen oxidant (strong base or strong acid for example), which determines the pH of the solution.

After the chemical reaction between the powder and the reagent, the product obtained is generally dried, ground and/or sieved so as to obtain a homogeneous pre-treated powder. The latter may be inspected to check for homogeneity. These operations are known to those skilled in the art, who will be able to adapt and implement them.

Examples of Embodiment of the Chemical Pre-Treatment

One example of embodiment is given for an AlSi12 alloy (predominantly aluminum). Reagents able to oxidize the aluminum are for example:

basic aqueous solutions of alkali hydroxide (KOH, NaOH), which when concentrated generate an aluminate ion ($AlO^{2-}$) but when more dilute generate aluminum hydroxide ($Al(OH)_3$); concentrated aqueous solutions of halogen acid (HCl, HF), which generate aluminum salts such as aluminum fluoride ($AlF_6^{3-}$) or aluminum chloride ($AlCl_3$).

For safety reasons and to avoid generating undesirable pollution, bases are preferred to halogen acids.

It is also possible to use water at a temperature higher than or equal to 80° C.

For the chemical reaction to be uniform around all the grains of the powder, the liquid of the reagent must advantageously envelop all the grains of the powder.

The inventors used a calculational method to determine the minimum volume required to coat all the grains of AlSi12 alloy powder based on its apparent density (comprised between 0.96 g·cm$^{-3}$ and 1.44 g·cm$^{-3}$) and its true density (2.66 g·cm$^{-3}$). An apparent specific volume (comprised between 0.69 cm$^3$·g$^{-1}$ and 1.04 cm$^3$·g$^{-1}$) and a true specific volume (0.38 cm$^3$·g$^{-1}$) were obtained. By calculating the difference between the apparent densities and the true specific volume, the specific volume of interstices around the powder was found to be comprised between 0.66 cm$^3$·g$^{-1}$ and 0.31 cm$^3$·g$^{-1}$. Taking the case of the least compact powder, the minimum specific volume of interstices was therefore 0.66 cm$^3$·g$^{-1}$. For practical reasons in respect of calculation, of margin of error and of manipulation, this specific volume was rounded to 1 cm$^3$·g$^{-1}$. For 1 gram of AlSi12 alloy powder it therefore takes 1 milliliter of reagent to ensure a good impregnation of all the grains in the reagent. Such a method and this calculated ratio may be applied to other metal powders to be pre-treated (i.e. powders other than powders of AlSi12 alloy).

Furthermore, this method is non-limiting and other methods, whether calculational or based on tests for example, may be used.

Once the minimum volume of reagent has been determined for a given mass of powder, the concentration of the reagent must be determined. The concentration of the reagent in particular influences:

the nature of the oxidized phase obtained on the periphery of the grains;

the thickness of the oxidized layer;

the surface porosity and topography of the oxidized grains.

One example of embodiment is given with a solution of sodium hydroxide (NaOH) as oxidizing reagent.

To optimally oxidize an AlSi12 alloy powder, the inventors have determined that sodium hydroxide (NaOH) must be present in the solution in a concentration range comprised between 0.125 mol·L$^{-1}$ and 5 mol·L$^{-1}$. This concentration range is given by way of indication, for sodium hydroxide as reagent and an AlSi12 alloy powder. This range is in no way limiting, as it in particular depends on the metal or alloy from which the powder is made, on the reagent used, on the targeted oxidized-layer thickness, on the type of phase targeted, etc.

The metal powder to be treated is mixed with the oxidizing reagent solution. According to one example of embodiment, the AlSi12 alloy powder is poured into a suitable container, for example a crystallizing dish, preferably a metal crystallizing dish, then the reagent solution is added. Since the reaction between the metal powder and the reagent is very exothermic, the reagent must be gradually poured in to prevent the reaction from running away, then mixed regularly to prevent the product from sticking to the walls of the crystallizing dish.

When the reaction between the AlSi12 alloy powder and the reagent solution is complete, drying is carried out to remove the water, for example by heating the reaction product at about 150° C. until vapor is generated no more.

The powder obtained must generally be ground and sieved to obtain a particle size suitable for additive manufacturing.

The powder thus obtained may lastly be inspected, for example using XRD and/or FTIR.

The attack of the caustic soda on the AlSi12 alloy generates, on the surface of the grains, an oxidized and porous layer, mainly of aluminosilicates and sodium carbonate in the presence of very concentrated caustic soda or of aluminum hydroxide and sodium carbonate in the presence of less concentrated caustic soda. By virtue of the porous structure of the oxidized layer, oxidation of the core of the grains is facilitated during additive manufacturing. These porous oxidized elements may, with suitable laser-fusion parameters, be easily converted into mainly stoichiometric alumina and a few minority phases such as: non-stoichiometric alumina, aluminosilicates, and metal residues.

Generally, it will be noted that those skilled in the art will be able to choose a suitable reagent to oxidize a given metal powder, in particular depending on the desired oxidation product(s) and/or phase(s).

Furthermore, those skilled in the art will be able to adapt the concentration of reagent in the solution depending on the reagent chosen and on the metal powder the surface of which is to be oxidized.

One method employed by the inventors is to carry out experiments with different concentrations of reagent being brought into contact with identical samples of metal powders, then to determine the thicknesses obtained around the grains, the nature of the oxidized phases, and the obtained porosities and/or absorbances, for example using one or more of the following techniques:

X-ray diffraction (XRD), which allows crystalline phases to be identified and quantified;

Fourier transform infrared spectroscopy (FTIR), which allows bands of molecular vibration in treated powders to be identified, and absorbance to be determined for a mid-infrared (MIR) laser;

spectrophotometry (in the UV, visible, or near-infrared) allows the absorbance of the treated powder to be evaluated for a near-infrared (NIR) laser;

a technique for measuring the true density of the treated powder, for example using a helium pycnometer, which allows the variation in the density of the powder during treatment to be followed.

This method allows the most suitable reagent concentrations to be determined.

This method is given by way of illustration and must not be considered limiting: suitable concentrations and reagent(s) may also be determined from the literature and/or by calculation and/or from databases, etc.

Step of Selective Laser Powder-Bed Fusion

Figure 2:
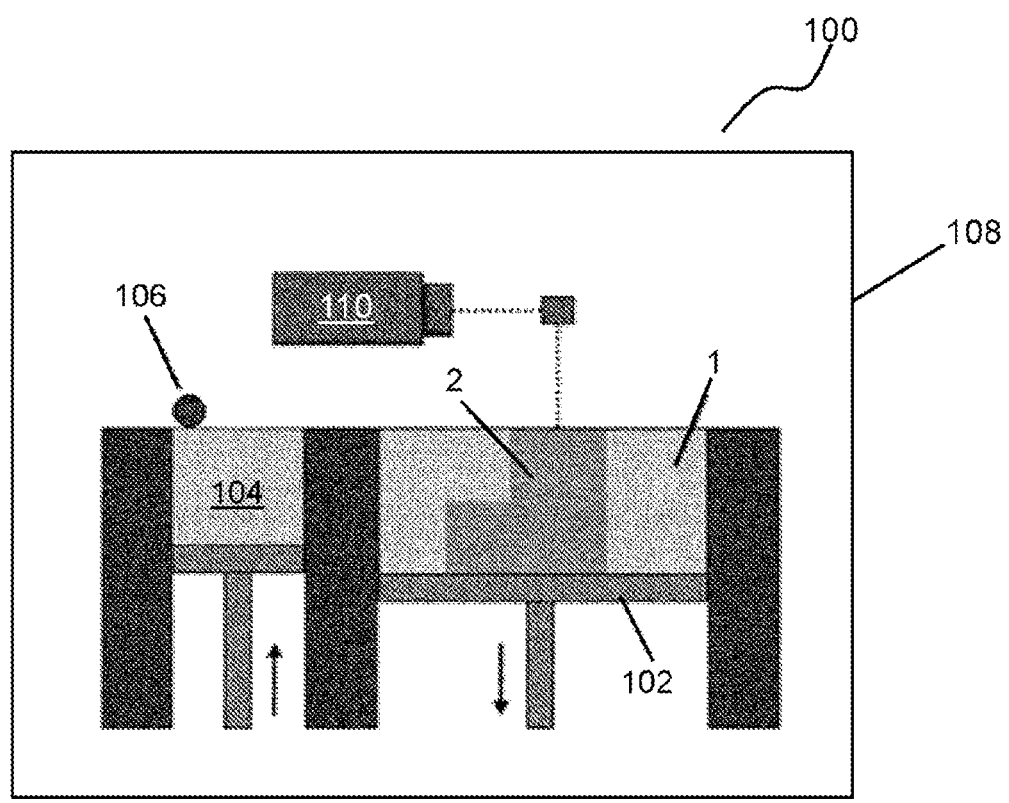
FIG. 2 shows an (SLM) device for additive manufacturing by laser powder-bed fusion.

FIG. 2 shows a so-called SLM additive-manufacturing powder-bed device 100 allowing the step of selective laser powder-bed fusion to be implemented, said device comprising a build plate 102 on which one or more parts 2 are manufactured using a process whereby a powder bed 1 is selectively fused by laser. The system 100 comprises a reservoir 104 able to contain a powder, and a powder diffuser 106 that allows a layer of powder from the reservoir to be deposited on or above the plate 102 where, under the effect of the energy transmitted by a laser 110, the powder is fused to produce a layer of the one or more parts to be manufactured. The process of deposition then fusion is repeated layer by layer until the one or more final parts are obtained. The plate 102 descends each time a layer is formed and a new layer of powder must be deposited. All of these components are placed in a gas-tight chamber 108 that allows the desired gas atmosphere to be obtained. The complete process is not described in more detail. A person skilled in the art may refer to the abundant literature on laser powder-bed fusion additive-manufacturing processes and variants of embodiment based on this same principle.

Thus, the pre-treated metal powder is placed in the reservoir 104 and the powder diffuser 106 allows a layer of said powder to be deposited on or above the plate 102. Logically, the first layer is deposited on the plate, and the following layers are deposited one on top of another.

The part that it is desired to manufacture comprises, even in the same layer of powder, dielectric and metal portions that correspond to various regions of said layer. Parameters of application of the laser are adjusted depending on the region.

Figure 3:
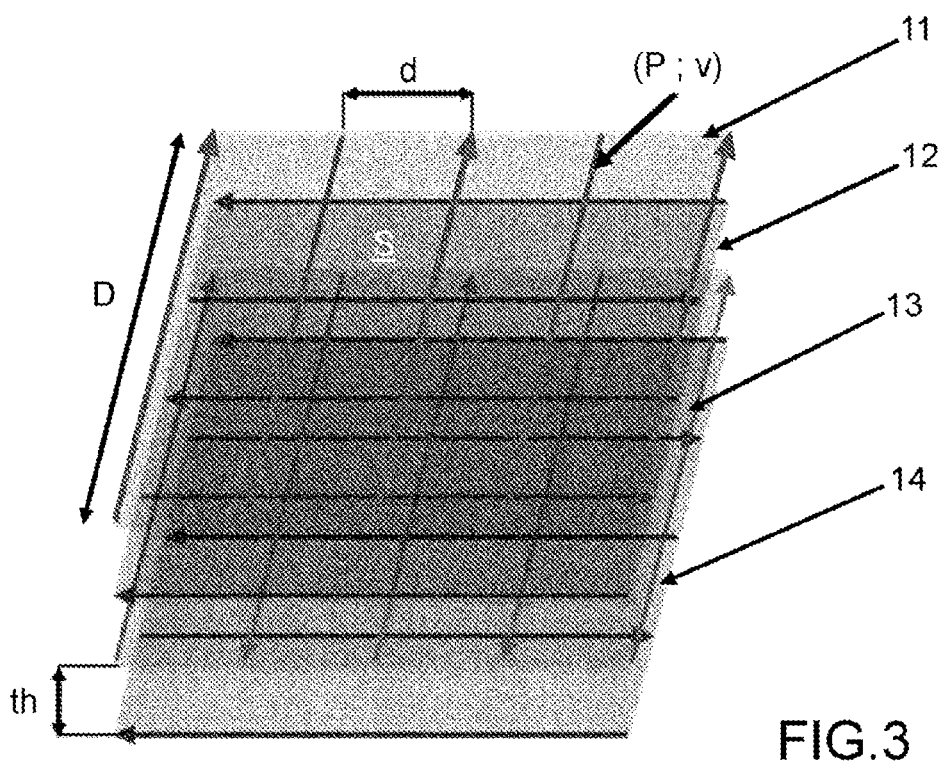
FIG. 3 illustrates four layers of powder placed on top of each other, and indicates the thickness of a layer and the parameters of application of the laser.

FIG. 3 illustrates four layers (11, 12, 13, 14) of pre-treated metal powder placed on top of one another, and indicates the thickness of a layer (Th) and parameters of application of the laser: the laser power (P), the speed of movement (v) of the laser, and the distance (d) between two movements. FIG. 3 also illustrates cells, in the case of a checkerboard scanning strategy. Each cell has an area (S) and a side length that corresponds to the movement (D) of the laser in the longitudinal direction, which is also a variable parameter of application of the laser.

Laser powder-bed fusion techniques use various laser-beam scanning strategies. Most strategies for scanning a laser over a given layer require the laser beam to travel a certain distance (D) in a longitudinal direction one way, i.e. forward or backward, then to shift transversely to the longitudinal direction by a given spacing value (d), then to travel in the longitudinal direction the other way, i.e. backward or forward, and so on, so as to scan all of an area (S) defined on the powder layer. With the commonly employed checkerboard strategy, the powder layer is divided into cells and the distance (D) traveled by the laser corresponds to a side length of each cell. A cell is scanned via successions of longitudinal movements and of transverse shifts. After one cell has been scanned, another cell is scanned until the entire checkerboard has been scanned. There are generally overlaps between the cells.

Scanning strategies are generally defined by programming the device.

With the process of the invention, the area of a cell is either mainly metal (generally with residues of oxidized phases) or mainly dielectric (generally with metal residues or even minority oxidized phases). The area of a cell is defined depending on the areas desired for the mainly metal and/or dielectric phases.

The power of the laser is generally the first parameter to adjust. Specifically, too low a power and not enough energy will be delivered to raise the powder to a sufficient temperature to convert it, and, conversely, too high a power and ablation will occur, making additive manufacturing impossible.

More precisely, surface power density, which is related to the power of the laser and to the diameter of the laser beam, is adjusted. The laser is preferably focused, so as to maintain a better resolution. Typically the diameter of the laser beam is comprised between 40 and 100 μm, and is for example equal to 70 μm.

The same laser power may be used to densify the metal without conversion, or the laser power may be modified.

In each and every case (conversion of the powder or densification without conversion), the speed of movement of the laser must not be too low, to avoid pitting and/or deformation of the powder bed. The speed of movement must also not be too high, to allow the powder to be heated sufficiently. The speed of movement of the laser is typically comprised between 10 mm·s$^{-1}$ and 5000 mm·s$^{-1}$. The following description gives speed values that are particularly suitable for converting a metal powder into a ceramic dielectric (typically a metal oxide or metal nitride) or, depending on other parameters of application of the laser, for densifying said powder without converting it.

As indicated above, to convert the pre-treated metal powder in the selective laser powder-bed fusion step, a chemical reaction must be produced between a gas and the metal, at high temperature for a certain length of time.

When the metal is oxidized, Wagner's theory of oxidation rate teaches that the mass of oxide obtained from the metal and oxygen in the air depends on:

the area of contact between the gas and the metal;
temperature;
the time spent at temperature;
the partial pressure of oxygen in the chamber.

This rate obtained for oxidation may be generalized to nitridation.

Figure 4:
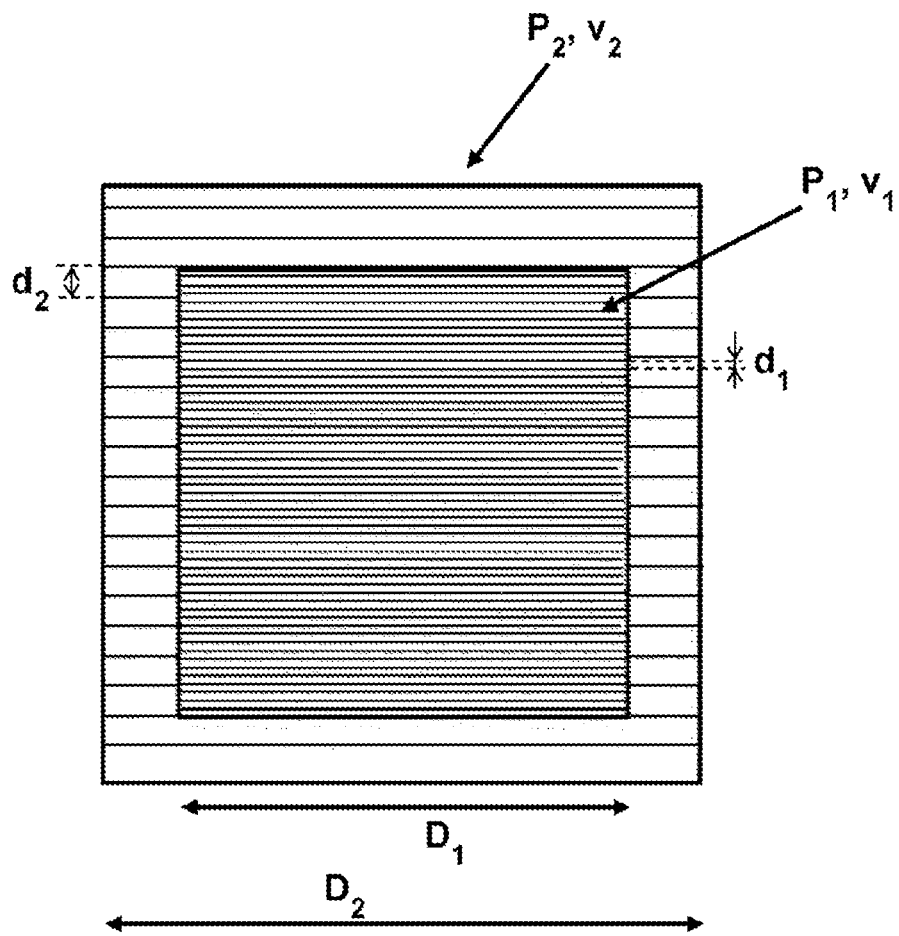
FIG. 4 illustrates the parameters used to convert the pre-treated metal powder into dielectric or to densify it without converting it.
Figure 5A:
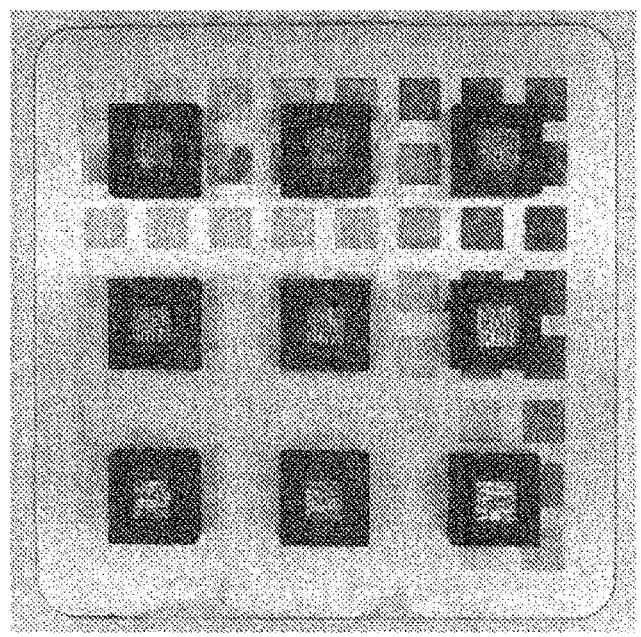
FIG. 5A-FIG. 5E illustrate a first example of multi-material parts obtained using a first example of a process according to the invention with variants.
Figure 5B:
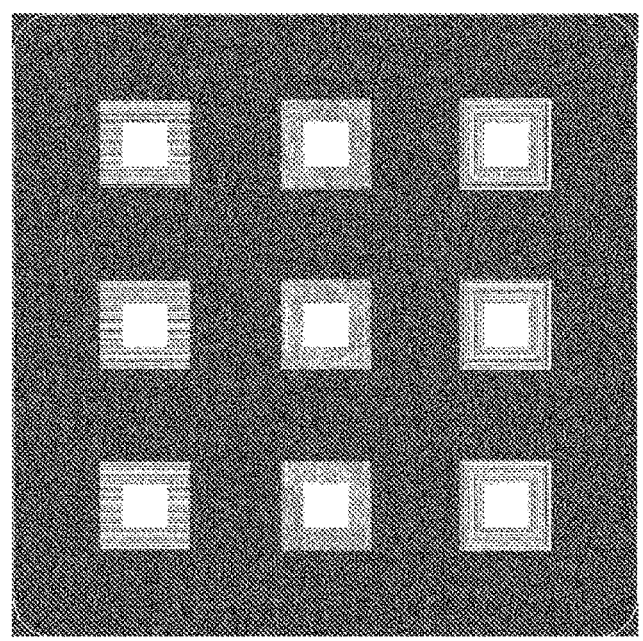
Figure 5C:
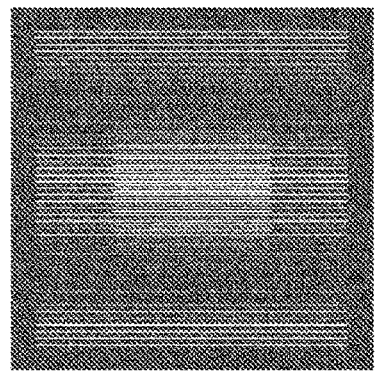
Figure 5D:
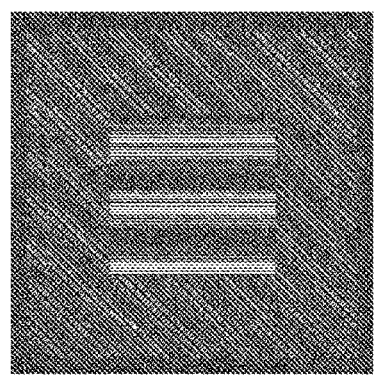
Figure 5E:
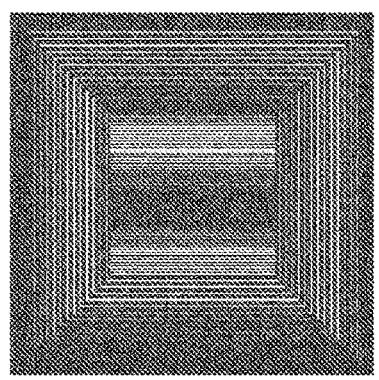

Parameters used to convert the pre-treated metal powder or to densify the pre-treated metal powder without converting it are illustrated in FIG. 4, taking the example of a part comprising a square dielectric core and a metal periphery.

Since the temperature of the powder is related to the density of heat received, it is necessary, to oxidize or nitride a unit area of given powder, to apply the laser beam to the pre-treated metal powder with a high degree of inter-vector overlap, so as to keep the powder surface at a high temperature for a sufficient length of time (first time $t_1$), and typically for a time of the order of one second, that is to say either a few seconds or a little less than one second. Examples of first times $t_1$ are given below.

Inter-vector overlap is the distance between the centers of the laser beam of two consecutive laser motion vectors. If this center-to-center distance is smaller than the diameter of the laser beam, there is overlap.

A large overlap, sufficient to convert the metal powder into dielectric, is obtained via a low spacing value (first spacing value $d_1$). Typical inter-vector spacing values are of the order of one µm, this allowing an overlap of at least 90% to be obtained. Examples of first spacing values $d_1$ are given below.

The speed of movement of the laser beam, or first speed of movement $v_1$, combined with low spacing values, is adjusted to convert a given unit area of powder into dielectric. Examples of first speeds of movement $v_1$ are given below.

As the oxidation rate must be relatively slow to be effective, the beam moves slowly and laser power may be low, or is not necessarily high.

To densify the metal powder without converting it, the laser beam may move at a speed (second speed of movement $v_2$) equivalent to the first speed of movement $v_1$, or even slower, but a smaller inter-vector overlap is then required. A low overlap value is obtained via a high spacing value (second spacing value $d_2$). Examples of second speeds of movement $v_2$ and of second spacings $d_2$ are given below.

The second time $t_2$ at temperature is in this case typically of the order of one tenth of a second, i.e. a few tenths of a second, or even less than one tenth of a second, and less than one second. Examples of second times $t_2$ are given below.

Thus, the parameters of application of the laser are adjusted depending on the region, so as to apply:

a first energy density $Q_1$, i.e. a laser beam with a first power $P_1$ for a first time $t_1$, to at least a first region of a layer of powder so as to convert said first portion into dielectric; and a second energy density $Q_2$, i.e. a laser beam at a second power $P_2$ for a second time $t_2$, to at least a second region of the layer of powder so as to densify said metal second portion without converting it, the first time $t_1$ being longer than the second time $t_2$ or the first energy density $Q_1$ being higher than the second energy density $Q_2$.

The first laser power $P_1$ may be comprised between 30 and 60 W. The second laser power $P_2$ may be comprised between 30 and 60 W. The first laser power may be equal to the second laser power.

The first time $t_1$ may be comprised between 0.7 and 2 seconds, and preferably between 1 and 2 seconds.

The first energy density $Q_1$ may be comprised between 10 and 20 kJ·mm$^{-2}$.

The second time $t_2$ may be comprised between 0.07 and 0.26 seconds, and preferably between 0.1 and 0.2 seconds.

The second energy density $Q_2$ may be comprised between 0.2 and 2 kJ·mm$^{-2}$.

As indicated above, the parameters of application of the laser allowing the dwell time t of the laser beam and therefore the energy density Q applied to a region of the powder layer to be varied are chosen from: the speed of movement v of the laser, the spacing d between two successive positions of the laser, the power P of the laser and the distance D traveled by the laser during a movement (and optionally the area S scanned by the laser). These parameters may have an effect on the conversion rate of the metal powder and are very easily programmable.

The movements of the laser beam are generally made in a direction that will be referred to as the longitudinal direction. Said movement is generally called the "laser vector", the length of said vector corresponding to the distance D. The spacing d of the laser beam corresponds to a shift between two longitudinal movements of the laser beam, in the same plane and generally transversely to the longitudinal direction, said shift generally being called the "gap between two vectors", or "inter-vector" gap. It will be noted that the distance traveled by the laser is not necessarily traveled in a straight line, the laser beam in particular making concentric movements, as will be described below.

The speed of movement and spacing used to convert a first portion of powder into ceramic are designated the first speed of movement ($v_1$) and first spacing ($d_1$), respectively. The speed of movement and spacing used to densify a second portion of powder into metal without converting it are designated the second speed of movement ($v_2$) and second spacing ($d_2$), respectively.

The first speed of movement $v_1$ may be comprised between 10 and 1000 mm·s$^{-1}$, preferably between 50 and 1000 mm·s$^{-1}$ and even more preferably between 100 and 1000 mm·s$^{-1}$.

The first spacing $d_1$ is preferably smaller than 10 µm and may be comprised between 1 and 10 µm.

The first spacing and the first speed of movement are related: the faster the first speed of movement, the smaller the first spacing must be to achieve a sufficient time at temperature, but, conversely, a large first spacing may be chosen if the first speed of movement is slow.

The second speed of movement $v_2$ may be comprised between 30 and 5000 mm·s$^{-1}$, preferably between 100 and 2000 mm·s$^{-1}$ and even more preferably between 100 and 1000 mm·s$^{-1}$.

The second spacing $d_2$ may be comprised between 1 and 200 µm, preferably between 10 and 200 µm, even more preferably between 20 and 100 µm, or between 50 and 100 µm.

The second spacing and the second speed of movement are related: the slower the second speed of movement, the larger the second spacing must be to avoid too long a time at temperature, but, conversely, a small second spacing may be chosen if the second speed of movement is fast.

The distance traveled by the laser, which is related to the strategy of movement of the laser beam, is also a usable parameter. Preferably, the first distance traveled by the laser to form the dielectric is smaller than 2 mm.

Suitable parameters may be determined beforehand by making a plurality of identical samples of pre-treated powder and varying the parameters of application of the laser applied to the various samples, the thicknesses of powder deposited, and/or the atmosphere in the chamber, then characterizing the parts obtained, these parts being called "test matrices" and for example taking the form of identical cubes. For example, by varying the parameters of application of the laser: the power of the laser (P), the speed of movement (v) of the laser, the spacing (d) between two successive passages of the laser, or even the distance (D) of the laser, a number of test cubes are obtained. The test cubes are then taken from the build plate and characterized to determine which is the predominant phase (metal phase or dielectric phase). It is thus possible to deduce therefrom parameters suitable for forming each of the predominant phases, these generally being expressed in the form of ranges of parameters. These determined parameters may then be used to manufacture the desired part directly.

The thickness (Th) of the formed layer of metal powder is larger than or equal to the average diameter of the grains, and typically larger than or equal to 30 µm, and preferably larger than or equal to 50 µm. The thickness of the formed layer is furthermore generally smaller than or equal to 200 µm, and preferably smaller than or equal to 150 µm.

The chamber is under a reactive, oxidizing or nitriding atmosphere. The gas used in the additive-manufacturing chamber participates in the chemical reaction allowing the pre-treated metal powder to be converted into dielectric.

The presence of oxygen allows a majority oxide phase of the converted pre-treated metal powder (for example: $Al_2O_3$) to be obtained. The presence of oxygen in the chamber is typically obtained with an oxygen partial pressure higher than or equal to 5%, preferably higher than or equal to 10%. It could be air.

The presence of nitrogen allows a majority nitride phase of the converted pre-treated metal powder (for example: AlN) to be obtained. The presence of nitrogen in the chamber may be ensured with air, bearing in mind that the partial pressure of nitrogen in the chamber will then increase as oxygen is consumed. It is possible to achieve a majority nitrogen atmosphere in the chamber by flushing it with dinitrogen once the chamber has been closed and before manufacturing commences.

First Example of Selective Laser Powder-Bed Fusion

The three parts formed and the scanning strategies used are illustrated in FIGS. 5A to 5E.

The parts formed are metal-ceramic parallelepipeds of square cross section, obtained by selective laser melting from an AlSi12 alloy powder pre-treated as described above. The outer shell of the part is mainly metal and the core is mainly alumina.

The chosen laser scanning strategies all featured a central square in which the alumina core was formed and three different strategies were used to form the metal border around the core:
  for the alumina core a square cell of 1 cm² was used;
  for the metal border, either a rectilinear strategy (FIG. 5C, corresponding to the left-hand columns in FIGS. 5A and 5B), or a hexagonal strategy (FIG. 5D, corresponding to the central columns of FIGS. 5A and 5B), or a concentric strategy (FIG. 5E, corresponding to the right-hand columns of FIGS. 5A and 5B) was used.

The partial oxygen pressure in the chamber was comprised between 10 and 21% (oxidizing atmosphere).

The laser spot diameter was comprised between 70 and 80 µm. The layering thickness was about 50 µm.

With the aim of converting the pre-treated powder of AlSi12 alloy into mainly $Al_2O_3$ oxide, successful trials were carried out with the following parameters:
  laser power ($P_1$) of 60 W;
  speed of movement ($v_1$) of the laser of 1000 mm·s$^{-1}$;
  spacing ($d_1$) of 1 µm for a degree of overlap of 99%.

With these parameters, for a distance (D) traveled by the laser of 1 cm, the first time ($t_1$) was equal to 0.7 seconds, and the first energy density ($Q_1$) was 11 kJ·mm$^{-2}$. The surface power density was 15.6 kW·mm$^{-2}$.

With the aim of densifying the pre-treated powder of AlSi12 alloy without oxidation, successful trials were carried out with the following parameters:
  laser power ($P_2$) of 60 W;
  speed of movement ($v_2$) of the laser of 100 mm·s$^{-1}$;
  spacing ($d_2$) of 50 µm.

In this first example of embodiment, the power of the laser did not vary, irrespectively of whether it was desired to oxidize or densify without oxidizing.

With these parameters, for a distance traveled (D) by the laser of 1 cm, the second time ($t_2$) was equal to 0.14 seconds, and the second energy density ($Q_2$) was 2.2 kJ·mm$^{-2}$. The surface power density was 15.6 kW·mm$^{-2}$.

Second Example of Selective Laser Powder-Bed Fusion

The two parts formed and the scanning strategies used are illustrated in FIGS. 6A to 6D.

The parts formed are metal-ceramic cylinders obtained by selective laser melting from an AlSi12 alloy powder pre-treated as described above. The outer shell of the part is mainly metal and the core is mainly alumina.

The scanning strategy used for the alumina core was a checkerboard with hexagonal patterns of 1 cm span. The scanning strategy used for the metal scanned concentric tracks around the central alumina.

Figure 6A:
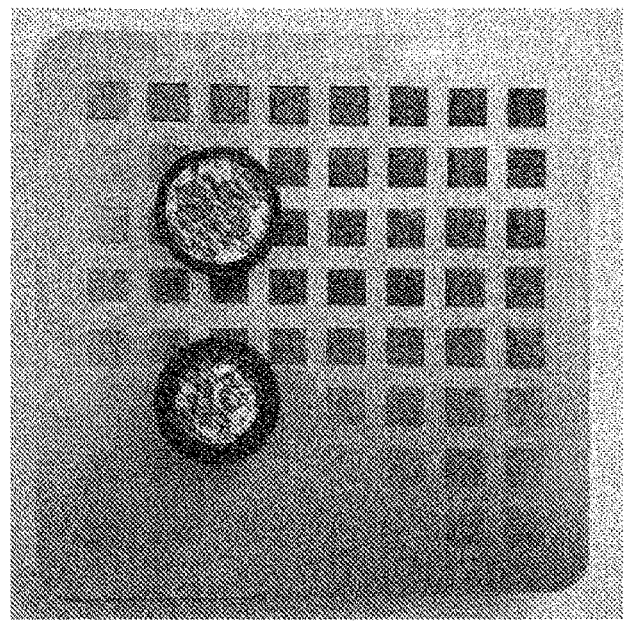
FIG. 6A-FIG. 6D illustrate a second example of multi-material parts obtained using a second example of a process according to the invention with variants.
Figure 6B:
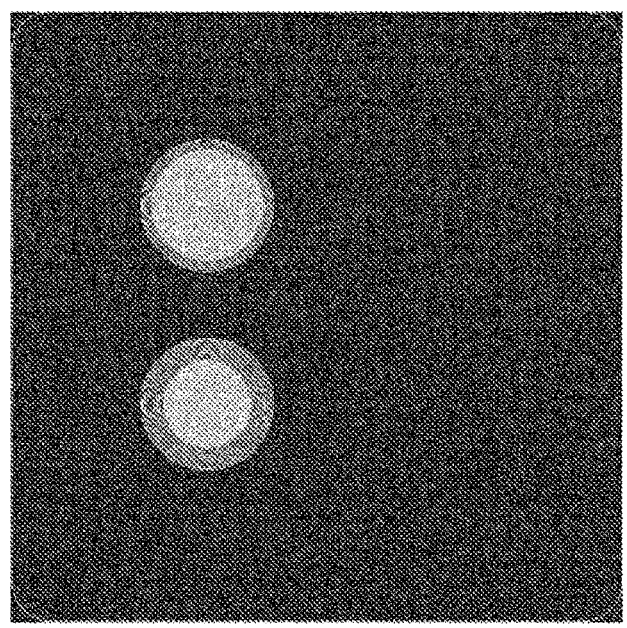
Figure 6C:
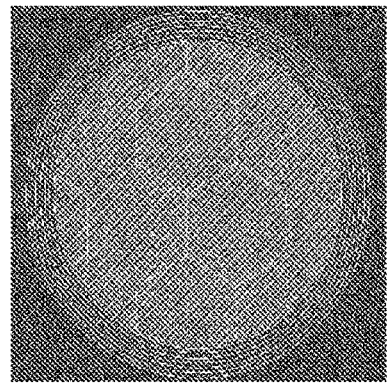
Figure 6D:
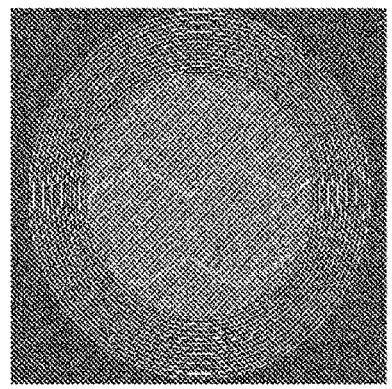

FIGS. 6C and 6D illustrate in detail two different outer-shell thicknesses.

The partial oxygen pressure in the chamber was comprised between 10 and 21% (oxidizing atmosphere).

The laser spot diameter was comprised between 70 and 80 µm. The layering thickness was about 50 µm.

To convert the pre-treated powder of AlSi12 alloy into mainly $Al_2O_3$ oxide, and to form the core mainly made of alumina, the following parameters were used:
  laser power ($P_1$) of 60 W;
  speed of movement ($v_1$) of the laser of 1000 mm·s$^{-1}$;
  spacing ($d_1$) equal to 1 µm.

With these parameters, for a distance (D) traveled by the laser of 1 cm, the first time ($t_1$) was equal to 0.7 seconds, and the first energy density ($Q_1$) was 11 kJ·mm$^{-2}$. The surface power density was 15.6 kW·mm$^{-2}$.

To densify the pre-treated powder of AlSi12 alloy without oxidation and to form the outer shell made mainly of metal, the following parameters were used:
  laser power ($P_2$) of 60 W;
  speed of movement ($v_2$) of the laser equal to 1000 mm·s$^{-1}$;
  spacing ($d_2$) equal to 50 µm.

With these parameters, for a distance traveled (D) by the laser of 1 cm, the second time ($t_2$) was equal to 0.014 seconds, and the second energy density ($Q_2$) was 0.22 kJ·mm$^{-2}$. The surface power density was 15.6 kW·mm$^{-2}$.

In all the examples and generally in the process according to the invention, as the absorbance of the pre-treated metal powder is increased with respect to a powder that is not pre-treated, at equal power, the transfer of electromagnetic energy from the laser to thermal energy in the powder is better, and hence the pre-treated metal powder will heat up more. The drawback is that ablation conditions may be achieved more easily. Preferably, in a first step, the power of the laser is adjusted so as to be equal to or below a power threshold below which ablation no longer occurs; and, once this threshold has been found and the laser power set, in a second step other parameters are adjusted depending on whether it is desired to convert the pre-treated metal powder into dielectric or just densify the metal without converting it.

The invention thus makes it possible, via simple adjustment of additive-manufacturing parameters, to create in 3D, at will and in selected areas, regions that are mainly metal or mainly dielectric. The additive-manufacturing parameters are easily adjustable by programming the additive-manufacturing device.

The process according to the invention thus makes it possible to produce multi-material parts in the build direction and in the build plane (3D multi-material parts), without having to change powder during manufacture, and using a conventional powder-bed fusion additive-manufacturing device. This is very advantageous in terms of the cost of manufacture or production of the powder, but also makes it easier to implement the process.

Comparative Trials With or Without Pre-Treatment

Comparative trials were carried out on metal powders that were not pre-treated. In order to convert a region of the powder layer into a ceramic (corresponding to the metal oxide in these trials), the parameters of laser speed (500 min/s or even 100 mm/s) and of pitch (1 μm) that were the most favorable to application, to this region, of a high temperature (at least higher than or equal to the melting point of the metal or of the metal alloy, at least 700° C. for example) for a sufficient time (at least one second or more) at a laser power of 75 W were used. Unfortunately, oxidation was not achieved therewith, the temperature reached not being sufficient within the powder. The inventors had to increase the power to 120 W to reach a sufficient temperature. The drawback is that, at this power level, the powder ablation occurs at the same time as oxidation, and takes precedence thereover. Furthermore, low speeds lead to longer build times.

The chemical pre-treatment of the metal powder allows the absorbance of the powder to be increased, and thus the efficiency of the transfer of energy to the powder to be increased, and hence the temperature within the powder is increased, without having to increase the power of the laser and thus without running the risk of ablation.

Conversely, with a pre-treated powder, but without suitable parameters of application of the laser (speed too high and/or spacing too large and/or unsuitable power), the powder cannot be oxidized, but remains in metal form. Furthermore, with an insufficient power, the required temperature within the powder cannot be reached and the latter is not only not oxidized, but also not densified (it remains a metal powder partially oxidized as a result of the pre-treatment).

Thus, it will be understood that the invention indeed consists of a combination of pre-treatment with suitable parameters of laser application, which combination allows a synergistic effect to be obtained and a part that is multi-material (metal and dielectric) in three dimensions to be formed.

Obtained Products (Multi-Material Parts)

With an AlSi12 alloy powder, it is possible to obtain multi-material parts comprising metal portions and ceramic portions mainly made of stoichiometric alumina but with a few minority phases such as: non-stoichiometric alumina, aluminosilicates, and metal residues. Furthermore, at the interface between the metal and the ceramic, an alumina layer that is probably non-stoichiometric and less conductive may be formed.

More generally, regarding the obtained product, metal portions may contain a few dielectric inclusions and, conversely, dielectric parts may contain metal incursions. This is why reference has been being made to a "mainly metal" phase with some residual dielectric phases or to a "mainly" dielectric phase with some metal residues, or even residues of oxidized metal phases resulting from the pre-treatment.

In certain cases, as any chemical bond between the metal of the build plate and the ceramic generated may be complex or even non-existent, the dielectric portion is preferably surrounded by a metal portion, the latter adhering well to the plate and playing the role of a barrier. Alternatively, the dielectric is formed on a mainly metal portion of the part.

Figure 7A:
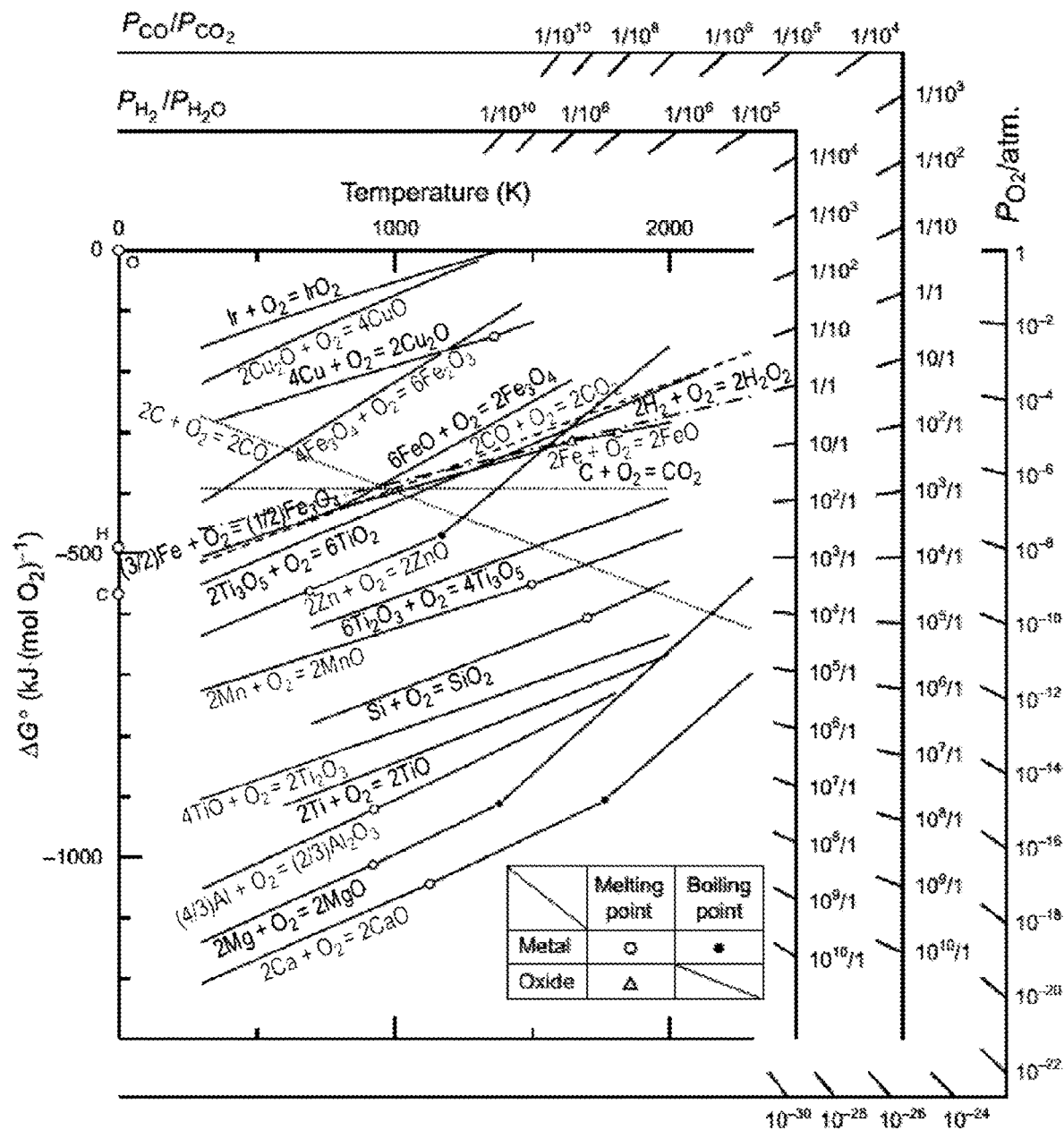
FIG. 7A.
Figure 7B:
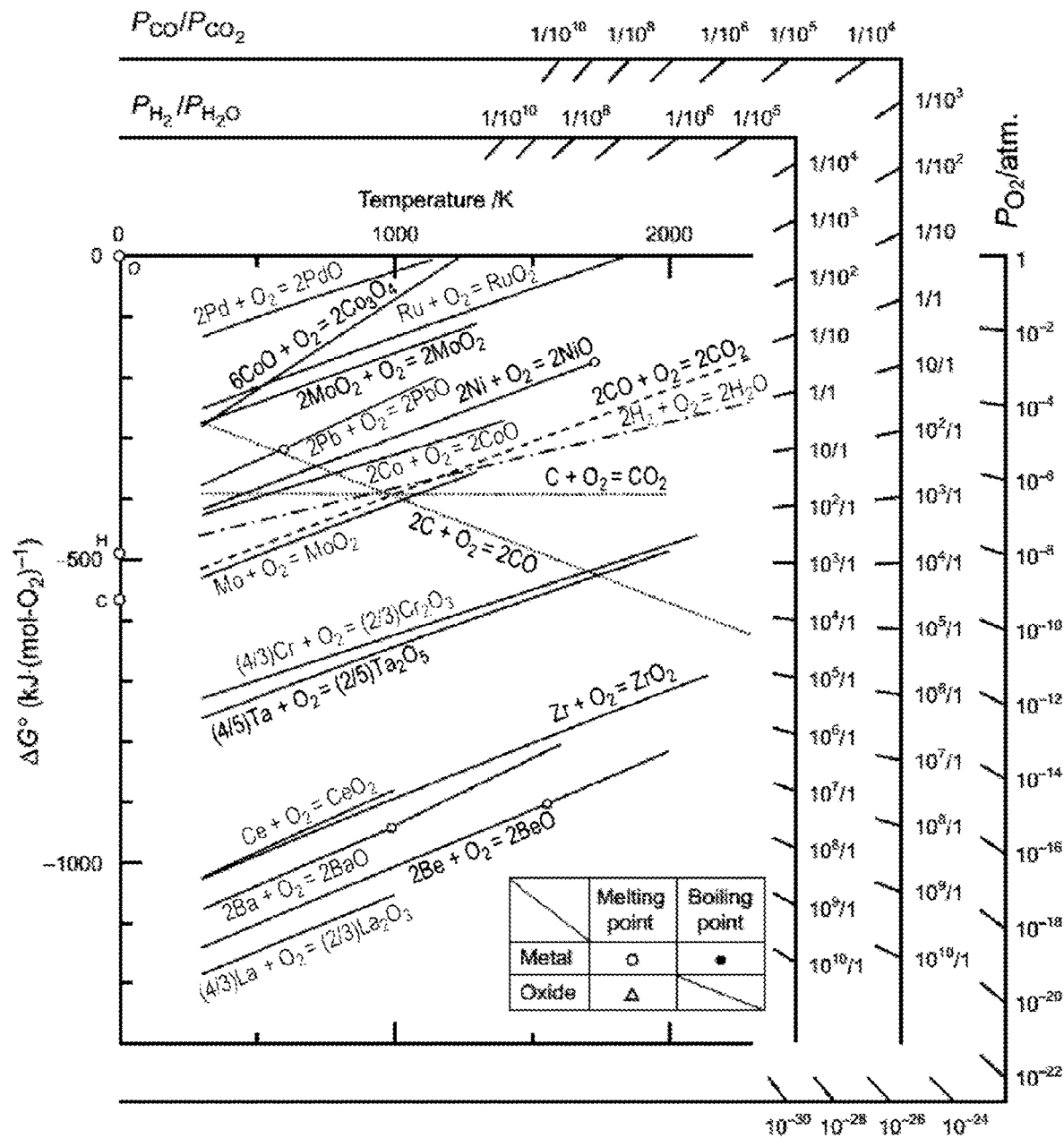
FIG. 7B illustrate two Ellingham diagrams showing metal-oxide equilibrium curves for a number of metals.

Other metal powders used may be powders conventionally used in additive manufacturing, in laser powder-bed fusion techniques, for example other aluminum-based alloys, powders of metals or alloys of metals other than aluminum, such as transition metals and poor metals, for example: alloys based on iron, cobalt or nickel, or metalloids such as silicon. Of particular interest are metals located in the central and upper part of Ellingham diagrams such as described for example in the publication "Ellingham Diagram" by Masakatsu Hasegawa (Graduate School of Energy Science, Kyoto University), which have been reproduced in FIGS. 7A and 7B, and alloys based on these metals. Ellingham diagrams allow equilibria between a metal and its oxides to be predicted as a function of temperature and pressure, and thermodynamically possible oxidation-reduction reactions between two species to be determined.

The present invention is not limited to the examples of embodiment described above but rather extends to any embodiment that falls within the scope of the claims.

The invention applies in particular:
- to production of mechanical devices, for example structural parts requiring a combination, in complex geometries, of complementary physico-chemical properties provided by association of a metal and of a ceramic (for example thermal barriers, nozzles, turbine fins, etc.);
- to production of parts mainly made of ceramic, production of which by conventional additive manufacturing is difficult (for example alumina and potentially the nitrides);
- to production of electronic devices, for example miniaturization of waveguides, resonators, and 3D microwave transitions for front-end active antennas;
- to production of metamaterials, in particular metamaterials comprising dielectric/ceramic inclusions distributed periodically in a metal matrix or metal inclusions distributed periodically in a dielectric/ceramic matrix.

The invention claimed is:

1. A process for manufacturing a multi-material part by additive manufacturing, said process comprising the following steps:
   a) a step of providing a pre-treated metal powder comprising grains and an oxidized and porous layer on a surface of said grains;
   b) a selective laser powder-bed fusion step comprising implementation of steps i) and ii) as follows:
      i) a step of forming a layer from the pre-treated metal powder;
      ii) a step of melting by laser all or some of said layer of pre-treated metal powder, said melting step being carried out under a reactive atmosphere and said melting step comprising changing parameters of application of the laser so that at least a first region of said layer of pre-treated metal powder is converted so as to lower the electrical conductivity thereof, thus forming a dielectric, and so that at least a second region of said layer of pre-treated metal powder is densified without being converted,
   the at least a first region being formed when the parameters of application of the laser allow a first energy density ($Q_1$) to be applied to said first region and/or the laser beam to be kept for a first dwell time ($t_1$) on said first region, the at least a second region being formed when the parameters of application of the laser allow a second energy density ($Q_2$) to be applied to said second region and/or the laser beam to be kept for a second dwell time ($t_2$) on said second region, and the first energy density being higher than the second energy density and/or the first dwell time being longer than the second dwell time.

2. The process as claimed in claim 1, the thickness of the oxidized and porous layer on the surface of the grains being comprised between 0.02 µm and 5 µm.

3. The process as claimed in claim 1, comprising, prior to the providing step, a step of pre-treating a metal powder so as to form an oxidized and porous layer on the surface of the grains.

4. The process as claimed in claim 3, the pre-treating step comprising bringing the metal powder into contact with an oxidizing reagent to achieve an oxidation-reduction reaction of said metal powder, the oxidizing reagent preferably being a strong acid or a strong base, and for example a halogen acid or an alkali hydroxide.

5. The process as claimed in claim 4, the pre-treating step comprising, subsequent to the oxidation-reduction reaction, at least one among the following steps: a drying step, a grinding step, a sieving step.

6. The process as claimed in claim 1, the first dwell time ($t_1$) being at least five times longer than the second dwell time ($t_2$), and preferably at least ten times longer.

7. The process as claimed in claim 1, the first energy density ($Q_1$) being comprised between 6 and 30 kJ mm$^{-2}$ and/or the second energy density ($Q_2$) being comprised between 0.2 and 5 kJ mm$^{-2}$.

8. The process as claimed in claim 1, the parameters of application of the laser being chosen from: the speed of movement (v) of the laser, the spacing (d) between two successive positions of the laser, the power (P) of the laser, and the distance (D) traveled by the laser.

9. The process as claimed in claim 8, the first laser power ($P_1$) used when forming the at least a first region being equal to the second laser power ($P_2$) used when forming the at least a second region.

10. The process as claimed in claim 8, the first speed of movement ($v_1$) used when forming the at least a first region being comprised between 10 and 1000 mm·s$^{-1}$ and the first spacing ($d_1$) used when forming the at least a first region being smaller than 10 µm.

11. The process as claimed in claim 10, the first speed of movement ($v_1$) being comprised between 100 and 1000 mm·s$^{-1}$.

12. The process as claimed in claim 8, the second speed of movement ($v_2$) used when forming the at least a second region being comprised between 30 and 5000 mm·s$^{-1}$ and the second spacing ($d_2$) used when forming the at least a second region being comprised between 1 and 200 µm.

13. The process as claimed in claim 12, the second speed of movement ($v_2$) being comprised between 100 and 1000 mm·s$^{-1}$.

14. The process as claimed in claim 8, the first distance ($D_1$) traveled by the laser during a movement to form the at least a first region being smaller than or equal to 2 mm.

15. The process as claimed in claim 1, the melting step being carried out under oxidizing atmosphere.

16. The process as claimed in claim 1, the melting step being carried out under nitriding atmosphere.

* * * * *